United States Patent [19]

Delpassand

[11] Patent Number: 5,107,968
[45] Date of Patent: Apr. 28, 1992

[54] HEATSHIELD FOR AIRCRAFT BRAKE

[75] Inventor: Majid S. Delpassand, Burlington, N.J.

[73] Assignee: The B. F. Goodrich Company, Akron, Ohio

[21] Appl. No.: 654,435

[22] Filed: Feb. 12, 1991

[51] Int. Cl.[5] .............................................. F16D 65/84
[52] U.S. Cl. ............................ 188/264 G; 188/264 R; 301/6 A; 244/121
[58] Field of Search ................ 188/71.1, 71.5, 264 G, 188/71.6, 264 A, 264 AA; 192/113 A, 70.12; 244/110 A, 111, 121; 301/6 A, 6 CS, 6 WB

[56] References Cited

U.S. PATENT DOCUMENTS

| | | | |
|---|---|---|---|
| 3,051,528 | 8/1962 | Rogers | 188/264 G |
| 3,887,041 | 6/1975 | Malone | 188/71.5 |
| 3,958,833 | 5/1976 | Stanton | 301/6 A |
| 3,983,047 | 10/1976 | Dowell et al. | 188/264 AA |
| 4,017,123 | 4/1977 | Horner et al. | 301/6 WB |
| 4,147,241 | 4/1979 | Preniczny et al. | 188/264 G |
| 4,623,951 | 11/1986 | DuPont et al. | 244/121 X |
| 4,703,837 | 11/1987 | Guichard | 188/264 GX |
| 4,856,619 | 8/1989 | Petersen | 188/18 A |
| 4,944,370 | 7/1990 | Chambers et al. | 188/71.5 |
| 5,002,342 | 3/1991 | Dyko | 188/264 GX |

Primary Examiner—Joseph F. Peters, Jr.
Assistant Examiner—Carla Mattix
Attorney, Agent, or Firm—Joseph Januszkiewicz

[57] ABSTRACT

A multi-disc brake assembly having a plurality of interleaved stator and rotor brake discs that are cooperative with a cylindrically shaped or cone shaped heat shield that has a honeycomb open cell structure which controllably limits the radiant and convection heat energy transfer out and away from the brake discs on frictional engagement and generation of heat therefrom.

12 Claims, 5 Drawing Sheets

FIG. 12
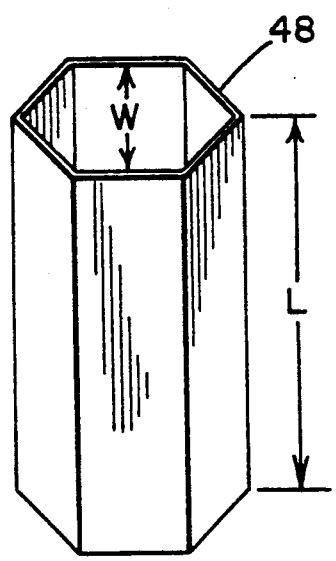
FIG. 13
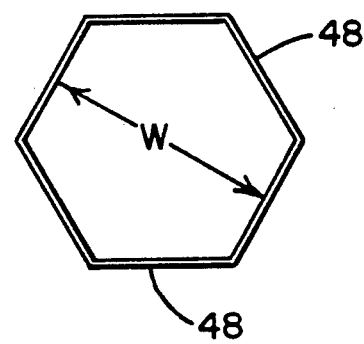
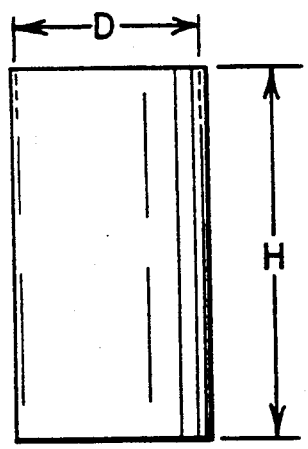
FIG. 14
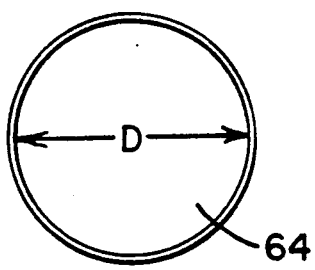
FIG. 15

HEATSHIELD FOR AIRCRAFT BRAKE

BACKGROUND OF THE INVENTION

This invention relates to a multi-disc aircraft brake system and more particularly to a new and improved heat shield for an aircraft multi-disc friction braking system.

During the braking of an aircraft, the alternately splined stator and rotor discs of the multi-disc brakes are brought into sliding contact with each other, generating considerable heat energy that must be dissipated to eliminate the highly deteriorative effects on the wheel and tire structure which, in certain instances such as abortive or rejected take-off, can result in sufficiently high heat to result in tire fires.

As the heat, heat energy or brake energy is generated within the braking elements of the stators and rotors (hereinafter also referred to as the heat sink), such heat energy is dissipated via conduction, radiation and convection to the adjacent braking components, such as the wheel assembly, bearings, pistons and other adjacent structures. It is important to limit the heat transfer to protect the structures as much as possible. One manner of protecting these areas is to provide a heat shield between the heat generating elements of the (stator and rotors) heat sink and the wheel assembly, with its adjacent components and bearings. Some heat shield constructions, as proposed and shown by U.S. Pat. Nos. 4,944,370 and 3,958,833, use a solid integral cylinder that prevents the transmission of heat energy directly radially outwardly from the heat sink with openings only at the respective axially-spaced ends. Such complete blocking of the heat energy transfer is not desirable, as this leads to heat concentration in the heat sink itself, which can lead to premature failure therein under heavy duty brake application, as in abortive take-offs. It is an object of the present invention to provide a heat shield that permits heat energy dissipation in a controlled, efficient manner without increasing the weight of the braking system. The present invention recognizes the need to provide a heat shield that can dissipate the heat energy from the heat sink radially, as well as axially. It is an object of the present invention to provide a heat shield that surrounds the heat sink and that allows controlled radial dissipation of heat energy by radiation, while simultaneously encouraging the dissipation of heat energy by convection, without concentrating the build-up of heat energy at the heat sink itself. Convection is defined as the transfer of heat by a circulatory motion through a medium at a non-uniform temperature, owing to the variation of density and the action of gravity. In this process, there must be a medium through which this heat transfer process occurs. In the case of the transfer of heat energy by radiation, the energy travels as a wave motion, which requires no medium for such transfer. Thus, in the case of two surfaces in space with no medium (such as air) between them, there can be a transfer of heat energy between them only by radiation and not by convection. Further, a necessary condition for two surfaces to transfer radiation energy to each other is that the two surfaces must be able to "see" or "view" each other, the magnitude of the radiation exchange between the two surfaces is directly proportional to how much of each surface is "visible" to the other surface. For example, if the two surfaces in space had a plate between them with a small hole therein, then the transfer of heat energy by radiation would be reduced to that only transmitted by the line of sight along lines interconnecting the two surfaces through the small hole in the plate. If such plate with the same diameter hole were made substantially thicker, then the amount of heat energy transferred would be reduced, since the deeper hole with the cylindrical wall would reduce the area exposed for transfer and emission of the heat energy.

SUMMARY OF THE INVENTION

The present invention is directed to a heat shield adapted to controllably transfer the heat energy generated by the braking action of the brake discs in a multi-disc brake system wherein the heat shield is a cylindrically-shaped honeycomb structure with a plurality of open cells. Such honeycomb heat shield may have its cells aligned with the axis of rotation of the brake discs to limit the directional transmission of radiant energy.

BRIEF DESCRIPTION OF THE DRAWINGS

FIG. 12 is a diagrammatic isometric view of a polygonal shaped honeycomb cell;

FIG. 13 is a diagrammatic plant view of a honeycomb cell shown in FIG. 12;

FIG. 14 is a diagrammatic side elevational view of a honeycomb cell;

FIG. 15 is a diagrammatic plan view of the honeycomb cell shown in FIG. 14.

DETAILED DESCRIPTION

Figure 1:
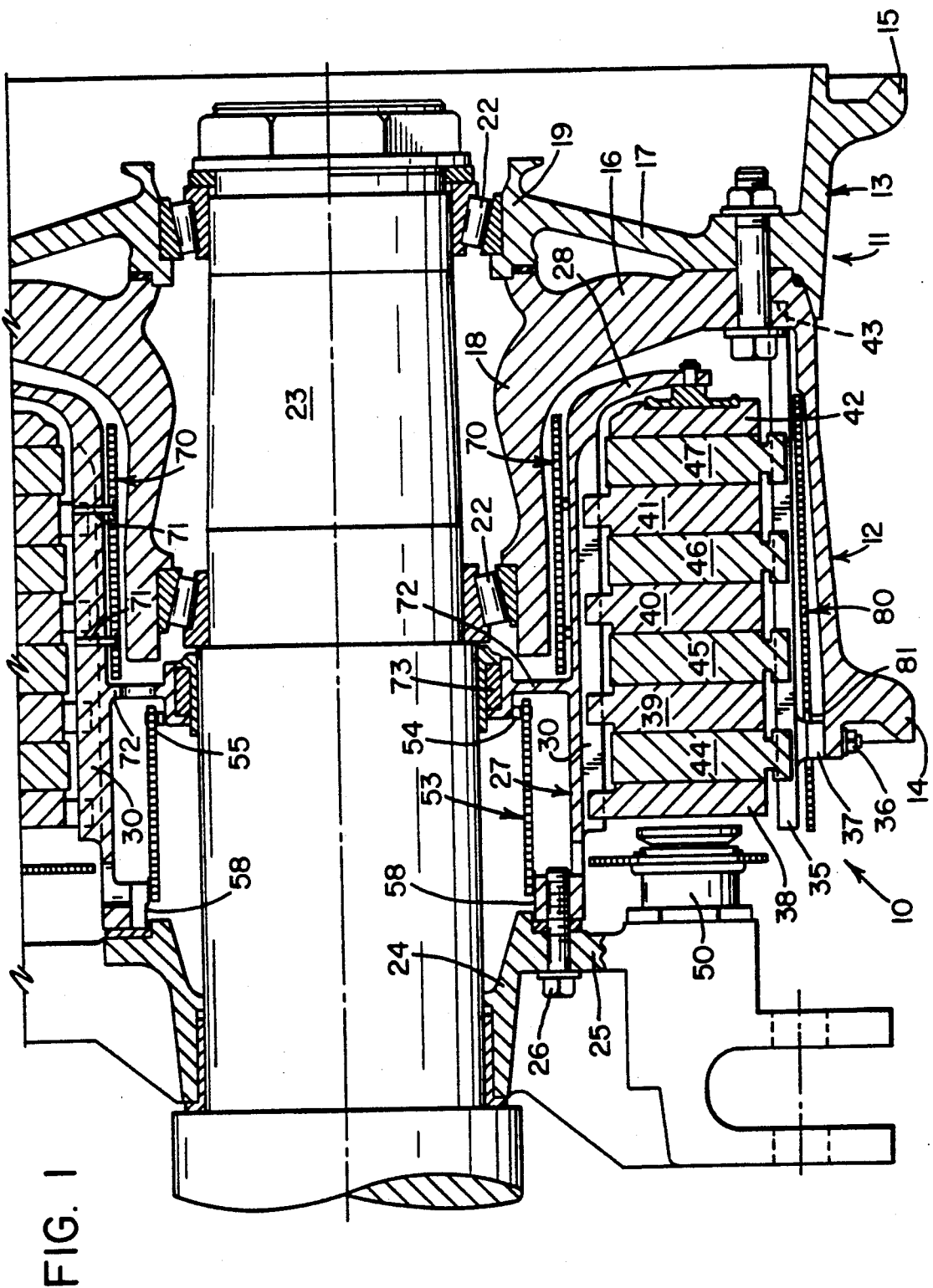
FIG. 1 is a fragmentary cross-sectional view of a brake assembly with a heat shield mounted therein.
Figure 2:
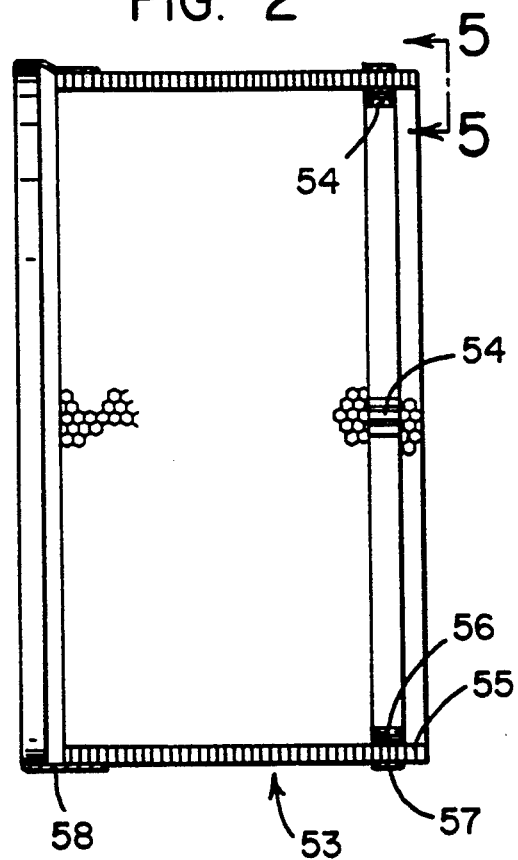
FIG. 2 is a side elevational view, partly in cross-section of a heat shield taken on line 2—2 of FIG. 3.
Figure 3:
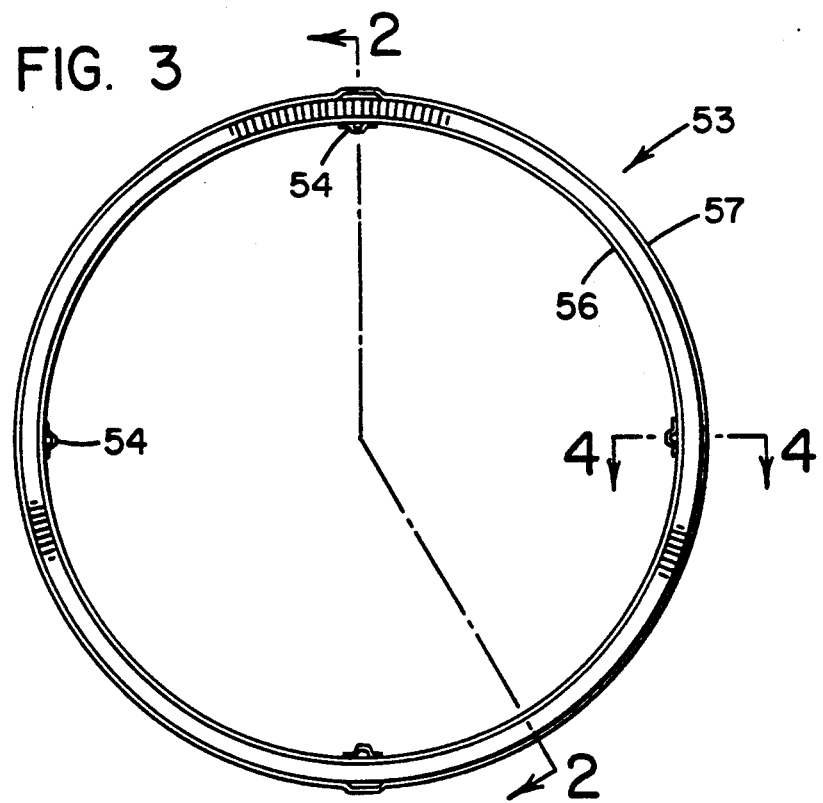
FIG. 3 is a front elevational view of the heat shield shown in FIG. 2.
Figure 4:
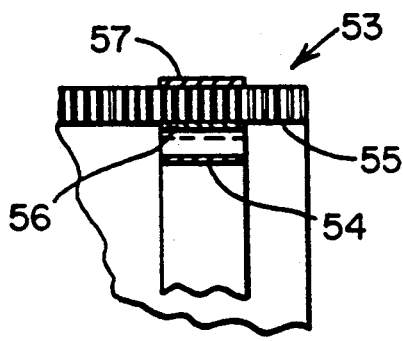
FIG. 4 is an enlarged fragmentary view of the heat shield taken on line 4—4 of FIG. 3.
Figure 5:
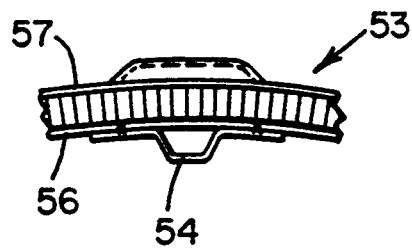
FIG. 5 is an enlarged fragmentary end view of a portion of the heat shield taken on line 5—5 of FIG. 2.

Referring to the drawings, wherein like reference numerals designate like or corresponding parts throughout the several views, there is shown in FIG. 1 a friction brake mechanism 10 for use with a cylindrical wheel 11, having matching wheel sections 12 and 13. Each of the wheel sections 12 and 13 has a rim member 14 and 15, web member 16 and 17, and hub members 18 and 19. The wheel sections 12 and 13 are fastened together by suitable bolts disposed in aligned bores within web members 16 and 17 to form an integral unit therewith.

The hub members 18 and 19 are supported for rotation on bearings 22 which are mounted on a nonrotatable axle member 23. A stationary carrier or boss 24 with a circumferentially-extending flange 25 is suitable mounted on stationary axle 23. Flange 25 has a plurality of circumferentially-spaced bores to receive bolts 26 for securing such flange to one end of a cylindrical torque tube member 27. The other end of torque tube member 27 has an annular and radially outwardly-extending reaction plate or reaction member 28. The reaction plate member 28 may be made integral with the torque tube member 27 or may be made as a separate annular piece and suitably connected to the torque tube or torque tube member 27.

Torque tube 27 has a plurality of circumferentially-spaced splines, ribs, or spline members 30 which are axially extending. Wheel section 12 has a plurality of circumferentially-spaced torque transmitting bars or wheel keys 35 connected thereto as at their inboard ends by bolts 36 and spacers 37. The other ends of the wheel keys 35 are connected to the upper portion of web section 16 by seating in an annular recess 43 in such web section. The torque-transmitting bars or keys 35 may be secured to the web section 16 of wheel 11 by other suitable means to provide an integral connection there between.

Ribs or spline members 30 support an axially non-rotatable end disc 38 and inner discs 39, 40 and 41 All of such nonrotatable discs 38, 39, 40 and 41 have slotted openings at circumferentially-spaced locations on the inner periphery for captive engagement by the spline members 30, as is old and well-known in the art. An annular disc or annular braking element 42 is suitably connected to the inner surface of the reaction plate 28 and acts in concert with the stator discs 38, 39, 40 and 41 which discs (38, 39, 40, 41 and 42) constitute the stators for the friction brake 10.

A plurality of axially-spaced discs 44, 45, 46 and 47 interspaced or interleaved between the stator discs 38 through 42, have a plurality of circumferentially-spaced openings along their outer periphery for engagement by the corresponding wheel keys 35, as is old and well known in the art, thereby forming the rotor discs for the friction brake 10. All of the non-rotatable discs (38, 39, 40, 41 and 42) and rotatable discs (44 through 47) may be made from a suitable brake material such as metal, steel or other wear-resistant material such as carbon for withstanding high temperatures and providing a heat sink. The number of discs may be varied, as is necessary for the application involved. The respective stator discs and rotor discs that have the circumferentially-spaced openings on the inner and outer periphery may accommodate reinforcing inserts to provide reinforcement to the walls of such slotted openings and to enhance the life of such slots, as is old and well-known in the art.

The actuating mechanism for the brake includes a plurality of circumferentially-spaced cylinders 50 suitable connected to the flange 25. Within each of the cylinders 50 is a hydraulic piston, which is operative to move the stator disc 38 axially into and out of engagement with the rotatable disc 44, which in turn operates to have all of the brake discs to frictionally engage their radial surfaces and are resisted by the end stationary annular disc 42 and the reaction plate 28 on torque tube 27. During this period of brake disc engagement, the friction forces among all the rotatable and non-rotatable discs generate considerable heat energy within the discs and the adjacent structures. It is the frictional engagement of these stator and rotor discs which produces the braking action for the aircraft wheel.

Figure 6:
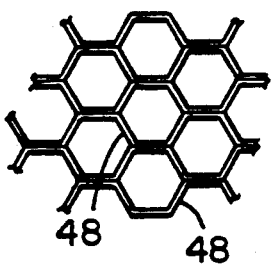
FIG. 6 is an enlarged fragmentary plan view of a portion of the heat shield showing the honeycomb structure.
Figure 7:
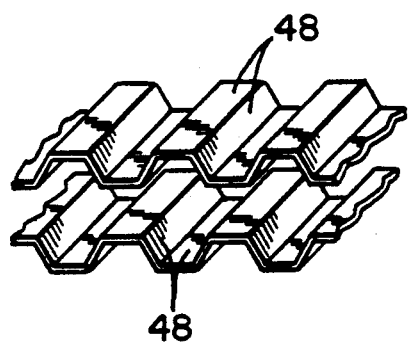
FIG. 7 is an enlarged isometrically-exploded view of a fragmentary portion of the honeycomb structure.
Figure 9:
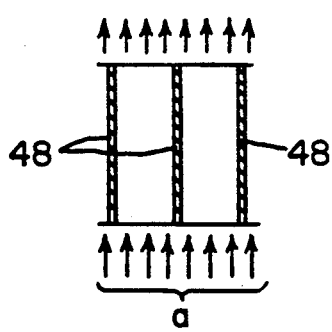
FIG. 9 is a diagrammatic view of a honeycomb cell of the heat shield illustrating the line of sight in a heat shield that is cylindrical throughout, as shown in FIGS. 1 and 2.

A cylindrical honeycomb heat shield 53, with a plurality of circumferentially-spaced brackets 54 on its inner peripheral end portion 55, provides means for securing the heat shield to the torque tube member 27 by friction as shown in FIG. 1. The heat shield 53 is made up from a plurality of stacked linear strips which have linear walls 48, which present a corrugated pattern as shown in FIG. 7, such that when two strips are placed together, the resulting pattern discloses the honeycomb structure of FIG. 6. Such construction permits the use of thin structural strips to provide a rigid structural member that can be shaped into a cylinder for a purpose to be described. As seen in FIGS. 2, 3, 4 and 5 a thin annular strip or ring 56 is suitably secured, as by welding to the inner periphery of the one end portion 55, while a thin annular strip or ring 57 is suitably secured to the outer periphery of the one end portion 55 opposite ring 56 to facilitate the construction of the heat shield. The other end portion of cylindrical heat shield 53 has a ring 58 suitably embossed and keyed as shown in FIG. 1 to a flange provided in spline member 30. Ring 58 is suitably secured to the outer periphery thereof to secure the honeycomb structure into its cylindrical shape. The cells produced by the honeycomb structure are non-tubular or polygonal in configuration with linear wall surfaces 48. As seen in FIG. 9, the linear wall surfaces 48 are generally parallel to a radial line that is perpendicular to the central axis of rotation of the cylinder. Although the honeycomb cell structure has been described as having polygonal configurations in plan view, such cells may also be of cylindrical configuration or other shapes.

Figure 11:
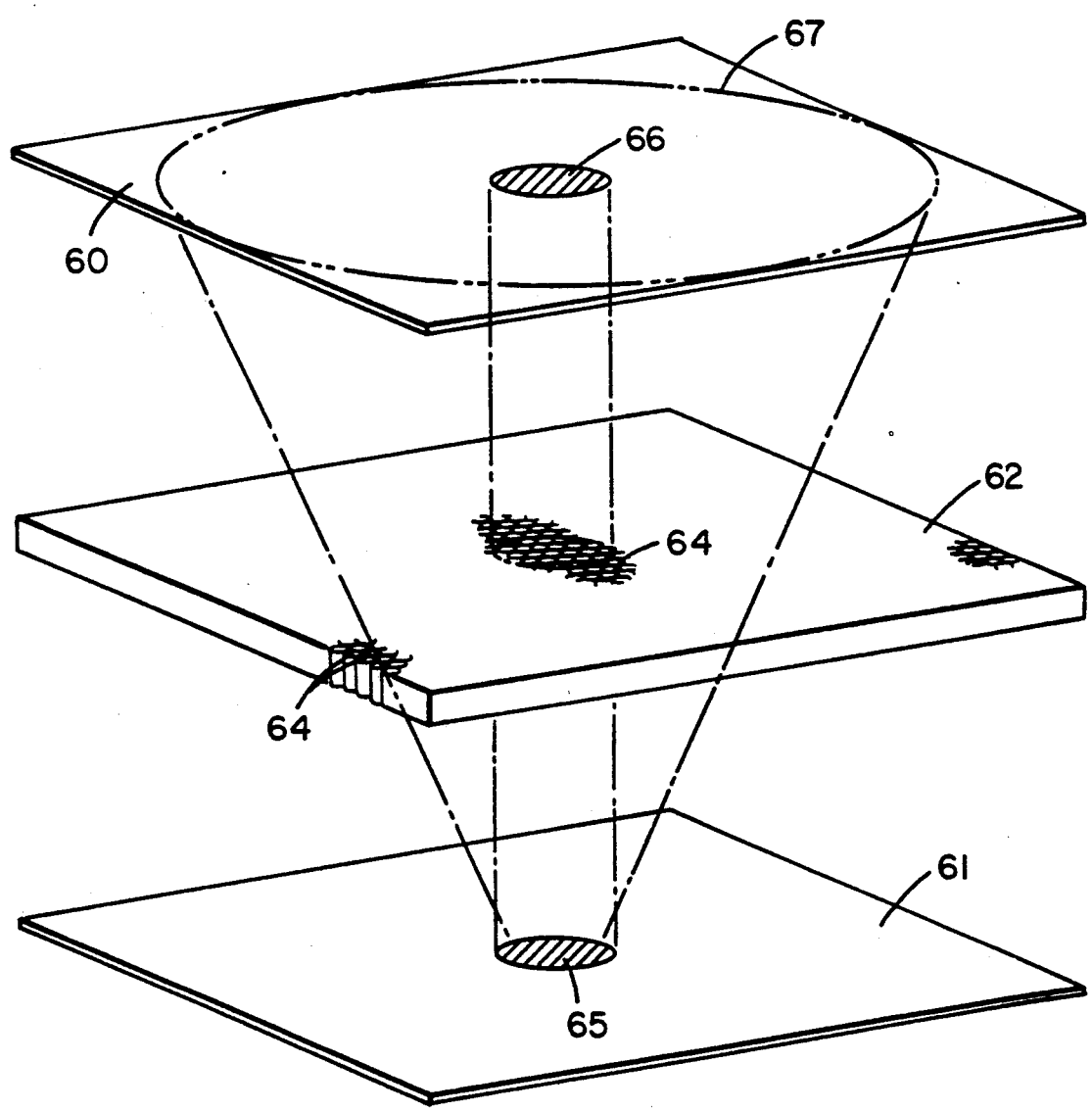
FIG. 11 is a perspective view of a portion of a heat shield illustrating the restricted and unrestricted field of view.

As depicted by FIG. 9, the lines designated "a", which represents the line of sight from the central axis all pass through the respective cells of the honeycomb structure. These same lines "a" also depict radiation energy which is transferred by a line of sight. To further amplify the significance of this, reference is made to FIG. 11 which depicts an upper cold surface 60, a hot lower surface 61 and a honeycomb structure 62 similar to that described with respect to FIG. 6, however, disclosing cylindrical cells 64. If a human eye designated by a small circle 65 were located at the hot surface 61, its field of view via line of sight would be limited to a small circle 66 on the cold surface 60 if looking through the honeycomb structure 62 containing cells 64. However, if no honeycomb structure 62 were present, then the line of sight from the human eye "65" would see a circle designated 67 on surface 60, which circle 67 is considerably larger than circle 66. For all the arrows other than those designated by "a" as the line of sight from circle 65 would strike the walls of the cells of the honeycomb structure 62 and thus be blocked from seeing the surface area between the circumference of the outer circle 67 and the circumference of the inner circle 66, with only those arrows "a" impinging on the surface 60 that define the small circle 66. By the same token, the radiant energy emanating from the hot surface 61 to the cold surface 60 is limited and reduced by placing the honeycomb structure between these surfaces, as only parallel lines of radiant energy is transmitted as the angular lines of transmission are restricted from radiation in the same manner as described above. Thus, honeycomb heat shield 53 limits the radiant heat transfer from the heat sink (stators and rotors) to the rim and tire structure during a braking application, while allowing convection currents to effect a cooling of the general area. Thus, the honeycomb heat shield structure significantly reduces the radiation heat transfer from such heat sink while allowing a controlled cooling of such heat sink. This is also significant because the honeycomb structure is lightweight and enhances the efficiency of the braking system by keeping the overall braking system lightweight.

Figure 8:
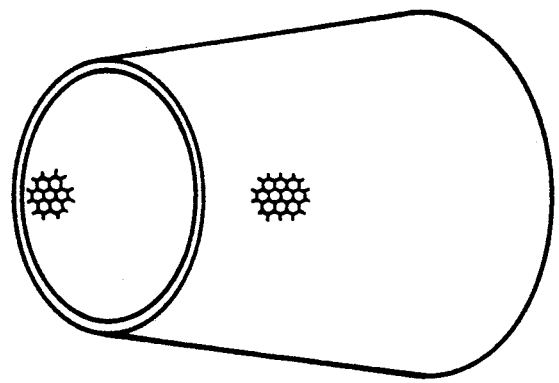
FIG. 8 is a perspective view of a conical form of a honeycomb heat shield.
Figure 10:
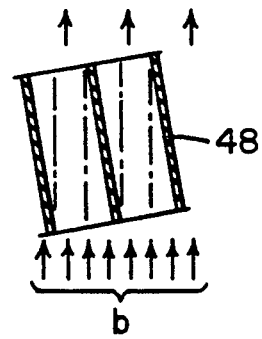
FIG. 10 is a diagrammatic view of a honeycomb cell of the heat shield, illustrating the reduced line of sight where the heat shield is conical as shown in FIG. 8.

FIG. 10 illustrates the tilting of the honeycomb structure relative to the line of sight wherein the line of sight designated "b" has a majority of the arrows blocked because the arrows "b" impinge on the walls of the cell. FIG. 10 has been tilted to illustrate the principle to contrast it with FIG. 9 which illustrates the arrows as parallel to the walls. Between these extremes, it is possible to further control the transfer of radiant energy from one surface to a second surface with a honeycomb structure there between. FIG. 8 illustrates a cone-shaped honeycomb heat shield which, by the principles discussed, can limit the transfer of radiant energy from the heat sink to the adjacent braking structure, which includes the wheel rim and tire. The cone-shaped structure of FIG. 8 is more severe to depict the principle involved.

Referring to FIG. 1, a second cylindrical honeycomb heat shield 70 is shown as attached to splines 30 of the torque tube 27 via screws 71; however, such heat shield 70 may also be suitably attached to a flange 72 that extends from an annular bearing 73 that is mounted on the stationary axle 23. The heat shield 70 is of the same honeycomb construction as that shown by FIGS. 2-7 and described above. The honeycomb structure may be cylindrical, as well as other configurations, as seen in plan view.

Heat shields 53 and 70 as described above are located adjacent to the axle and are often referred to as axle heat shields. A wheel heat shield is shown in FIG. 1 as a cylindrically-shaped honeycomb heat shield 80, located between the inner surface of wheel section 12 and the torque-transmitting bars 35. The heat shield 80 is suitably secured, either to the torque bars 35 or to the wheel section 12. The heat shield 80 has a plurality of circumferentially-spaced openings 81 along its inboard end to facilitate the passage of bolts 36 and spacers 37 therethrough for attaching the torque transmitting bars 35 to the wheel section 12. The honeycomb structure of the heat shield 80 is similar to that described above, with respect to honeycomb heat shield 53, with the cells being polygonal or circular in configuration, as shown in plan view or other configuration. Further, such heat shield 80 is shown as cylindrical in shape, similar to that of shield 53 in FIG. 2 or may be conical in overall configuration as shown in FIG. 7, with the degree of taper dependent on the clearance space available between the wheel section 12 and the torque-transmitting bars or wheel keys 35.

The polygonally shaped cells of the heat shield described above and illustrated by FIGS. 6 and 7, and the cylindrically shaped cells as described above and illustrated by FIG. 11 are further illustrated by FIGS. 12-15. The polygonally shaped cells of FIGS. 12 and 13 have cell walls 48 which have a length designated L and a width W. The width is the distance between opposite wall surfaces of the cell wall 48 where measurement is taken along a line normal to such wall surfaces. The cylindrically shaped cell of FIGS. 14 and 15 have a height designated H with a diameter designated D. Hereinafter the length of a cell or cells refers to length L as depicted by FIG. 12 and includes the dimension H as depicted by FIG. 14. The width of a cell refers to the dimension W as depicted by FIG. 13 and includes the dimension D as depicted by FIG. 15.

It will be apparent that, although a specific embodiment and certain modifications of the invention have been described in detail, the invention is not limited to the specifically illustrated and described contraction, since variations may be made without departing from the principles of the invention.

I claim:

1. In an aircraft wheel and brake assembly having a stationary axle with a stationary circular flange thereon, said axle having a central axis, bearing means mounted on said axle; a wheel support mounted on said bearing means for rotation relative to said axle about said central axis, said wheel support having an inner peripheral axially extending surface and a radially inwardly disposed web portion, a torque tube with an annular hub secured to said stationary flange; said torque tube having a plurality of circumferentially spaced splines; a plurality of stator discs having circumferentially spaced recesses for engagement with said splines on said torque tube for axial movement thereon; a plurality of circumferentially spaced wheel keys located radially inwardly of said inner peripheral axially extending surface with a clearance space therebetween, fastener means securing selected portions of said wheel keys to said wheel support, a plurality of rotor discs splined to said wheel keys for rotation therewith and for axial movement thereon; said rotor discs interleaved with said stator discs too define a heat sink; power means mounted on said flange for moving said stator discs and said rotor discs toward each other to effect a braking; at least a pair of heat shield means located within said wheel and brake assembly, one of said heat shields located between said axle and said torque tube for encompassing a portion of said axle, the other one of said heat shields located between said inner surface of said wheel support and said wheel keys for encompassing at least a major portion of said heat sink, bracket means securing said one heat shield to said flange and said other heat shield to said wheel support, and said heat shields formed from a honeycomb structure with open cells to control the flow of radiant energy from said heat sink to said axle and said wheel support.

2. In an aircraft wheel and brake assembly as set forth i claim 1 wherein said cells have wall surfaces whose extensions are generally normal to said central axis.

3. In an aircraft wheel and brake assembly as set forth in claim 1 wherein said cells have wall surfaces whose extensions make acute angles with said central axis.

4. In an aircraft wheel and brake assembly as set forth in claim 2 wherein the length of said wall surfaces of said cells is greater than the width between opposite surfaces of the cell walls of the same cell.

5. In an aircraft multiple disc and brake assembly having an axle with a central axis; bearing means mounted on said axle; a cylindrical wheel member journaled on said bearing means; said cylindrical wheel member having an inner peripheral circumferentially extending annular surface and a radially inwardly extending web portion for mounting on said bearing means for rotation thereon; a plurality of circumferentially spaced torque transmitting bars extending axially along said inner peripheral portion, each of said torque transmitting bars having one end mounted on said web portion and the other end secured too said wheel member; a plurality of axially spaced rotor discs mounted on said axle and keyed to said torque transmitting bars for rotation therewith; said axle having a circular stationary hub with an annular flange; a torque tube mounted on said axle to encompass a portion thereof; said torque tue secured to said annular flange; said torque tube having a plurality of axially extending ribs; a plurality of stator discs with circumferentially spaced slots engaging said ribs for axial movement thereon; said rotor discs interleaved between said stator discs too define a heat sink; means mounted on said annular flange for moving said discs axially into frictional engagement with each other to effect a braking action; a honeycomb heat shield means encompassing said heat sink and located in the clearance space between said inner peripheral circumferentially extending surface of said wheel member and said torque transmitting bars to control the flow of radiant energy from said heat sink to said cylindrical wheel member; and bracket means securing said heat shield means to said wheel member.

6. In an aircraft multiple disc and brake assembly as set forth in claim 5 wherein said honeycomb heat shield has a plurality of cells that are circular in plan view to facilitate the control of radiant energy transmission from said heat sink to said wheel member.

7. In an aircraft multiple disc and brake assembly as set forth in claim 5 wherein said honeycomb heat shield has a plurality of cells that are polygonal in plan view to facilitate the control of radiant energy transmission from said heat sink to said wheel member.

8. In an aircraft multiple disc and brake assembly as set forth in claim 7 wherein said honeycomb heat shield has a plurality of open cells with wall surfaces; and the extension of said wall surfaces are normal to said central axis.

9. In an aircraft multiple disc and brake assembly as set forth in claim 5 wherein said honeycomb heat shield means is composed of a plurality of open cells with wall surfaces, and the extension of said wall surfaces are generally normal to said central axis thereby limiting the transmittal of radiant energy from said heat sink to said inner peripheral circumferentially extending annular surface of said cylindrical wheel member.

10. In an aircraft multiple disc and brake assembly as set forth in claim 5 wherein said honeycomb heat shield has an axis that is coincident with said central axis, and said honeycomb heat shield has a configuration that is a frustum of a cone.

11. In an aircraft multiple disc and brake assembly having an axle with a central axis; bearing means mounted on said axle; a cylindrical wheel member journaled on said bearing means; said cylindrical wheel member having an inner peripheral circumferentially extending potion and a radially disposed web portion for mounting on said bearing means for rotation thereon; said inner peripheral portion has a plurality of circumferentially spaced splines; a plurality of axially spaced rotor discs mounted on said axle and keyed to said splines for rotation therewith; said axle having a stationary circular hub with an annular flange; a torque tube mounted on said axle to encompass a portion of said axle; said torque tube secured to said flange; said torque tube having a plurality of axially extending ribs; a plurality of stator discs with circumferentially spaced slots engaging said ribs for axial movement of said stator discs; said rotor discs interleaved between said stator discs; means mounted on said annular flange for moving said discs axially into frictional engagement with each other; a cylindrical honeycomb heat shield mounted on said flange wherein said shield extends between said axle and said interleaved stators and rotors to permit the flow of convection air currents for cooling said discs while restricting the flow of radiant energy between said interleaved stators and rotors and said axle.

12. In a multi-disc wheel brake assembly comprising a stationary axle and a rotatable wheel support, said wheel support having a central axis of rotation, a non-rotatable torque-taking structure mounted on said axle, a plurality of annular stator discs axially slidably coupled to said non-rotatable torque-taking structure at their inner peripheries and interleaved with a plurality of annular rotor discs axially slidably coupled at their outer peripheries with said wheel support, said torque-taking structure including a torque tube having a plurality of longitudinally extending circumferentially spaced ribs that engage said stator discs at said inner peripheries, said stator discs interleaved with said rotor discs to define a heat sink, heat shield means mounted on said brake assembly having one portion attached to said torque tube and having another portion attached to said wheel support, said heat shield means having a honeycomb structure with a plurality of open cells with wall surfaces, and the extension of said wall surfaces intersect said central axis at substantially right angles to thereby limit the transmission of radiant energy from said heat sink.

* * * * *